(12) United States Patent
Albrecht

(10) Patent No.: US 6,182,895 B1
(45) Date of Patent: Feb. 6, 2001

(54) METHOD AND SYSTEM FOR GIFT CREDIT CARD

(76) Inventor: Jerry L. Albrecht, 2257 Charles Rd., Marion, IN (US) 46952

( * ) Notice: Under 35 U.S.C. 154(b), the term of this patent shall be extended for 0 days.

(21) Appl. No.: 09/417,733

(22) Filed: Oct. 14, 1999

Related U.S. Application Data

(63) Continuation of application No. 08/944,392, filed on Oct. 6, 1997, now Pat. No. 5,984,180.

(51) Int. Cl.[7] .................................................. G06K 5/00
(52) U.S. Cl. ........................................ 235/380; 235/379
(58) Field of Search .................................... 235/329, 380

(56) References Cited

U.S. PATENT DOCUMENTS

| | | | |
|---|---|---|---|
| Re. 32,985 | 7/1989 | Nagata et al. | 364/401 |
| 4,107,515 | 8/1978 | Thornburg et al. | 235/488 |
| 4,689,018 | 8/1987 | Trinity | 434/109 |
| 4,700,055 | 10/1987 | Kashkashian, Jr. | 235/379 |
| 4,736,094 | 4/1988 | Yoshida | 235/379 |
| 4,809,837 | 3/1989 | Hayashi | 194/205 |
| 4,837,422 | * 6/1989 | Dethloff | 235/380 |
| 5,500,514 | 3/1996 | Veeneman et al. | 235/381 |
| 5,845,256 | 12/1998 | Pescitelli | 235/381 |
| 6,021,943 | * 2/2000 | Chastain | 235/379 |

* cited by examiner

*Primary Examiner*—Harold I. Pitts
(74) *Attorney, Agent, or Firm*—Woodard, Emhardt, Naughton, Moriarty & McNett

(57) ABSTRACT

A method and system for providing purchasable value for gifts and other uses in the form of a credit instrument is provided. A purchaser of a gift credit instrument authorizes a credit institution with which the purchaser holds a credit account to create a limited-value, non-renewable secondary account linked exclusively to the purchaser's credit account. A credit instrument is issued to an authorized user which credit instrument uniquely identifies the secondary account. The gift credit instrument may be used in the same manner as the purchaser's credit instrument; however, it expires after a certain period of time or after the initial value of the secondary account is spent. A system for carrying out the method is also provided.

16 Claims, 6 Drawing Sheets

METHOD AND SYSTEM FOR GIFT CREDIT CARD

This application is a continuation of application Ser. No. 08/944,392, filed Oct. 6, 1997 now U.S. Pat. No. 5,984,180.

BACKGROUND OF THE INVENTION

This invention relates generally to systems and methods for performing credit transactions. Specifically, this invention relates to a method and system for providing purchasable value to a credit account holder, which value is in the form of a secondary account and credit instrument having a limited value and useful at a plurality of retail institutions or other locations where purchases may be made using credit.

It has been known for retail and other institutions to offer cash-equivalent value in the form of paper gift certificates that an individual may purchase. The purchased value is generally honored at any location of the offering institution. The individual purchasing such cash-equivalent value (the purchaser) may elect to give the value to another person (the recipient) or may keep it for later use. In this way, a recipient of such value may effectively spend a limited amount of the purchaser's money on items of the recipient's choosing.

Commonly, paper gift certificates representing such cash-equivalent value are printed and offered for sale by individual retail institutions or small localized collections of individual retail stores, e.g. the retail stores located in a particular shopping mall. These sponsoring institutions offer one or more locations generally in or around their retail sales areas where paper gift certificates may be purchased. A purchaser goes to one of these locations, and asks to purchase a certain value, for example $100.00. A clerk then prepares, generally by printing or hand-writing, one or more certificates representing the requested value. The customer, in exchange for the cash-equivalent value of the certificates, tenders cash, negotiable instruments, a credit instrument or other method of payment in the amount of the purchased value plus any required service charge.

The purchaser takes the paper certificates and keeps them in his or her possession until such time as he or she may give them to recipient. The paper certificates may or may not be made out specifically in the name of the recipient. The recipient then may, at his or her convenience, go to the sponsoring institution and redeem the certificates in full or partial payment for goods or services, according to the rules for redemption established by the sponsoring institution. The sponsoring institution accepts the certificates, returning any overpayment to the recipient in cash, in the form of another paper gift certificate, or in another form of value. The sponsoring institution keeps the redeemed gift certificates with received cash and negotiable instruments for accounting and security purposes. Redeemed certificates may be kept for relatively long periods by sponsoring institutions, also for accounting and security purposes.

There are, however, numerous disadvantages to purchasable value systems using paper gift certificates. Such programs are quite costly to the sponsoring institution. A paper gift certificate system is paper-intensive, including the associated costs of paper and printing. Paper certificates, frequently in numerous denominations, must be purchased or printed by the sponsoring institution and stored at retail locations or other locations prior to being placed in circulation. They must also be stored at retail or other locations after redemption. Another major cost to the sponsoring institution is accounting. Paper certificates must be tracked prior to use and as they are placed into circulation, frequently by hand-writing the serial numbers of certificates being placed into circulation into a log. After redemption, paper certificates must also be tracked and entered into the sponsoring institution's financial records. Another disadvantage to sponsoring institutions concerns security. Paper certificates can easily be lost, misplaced, or stolen from the sponsoring institution's locations. Further, as with any other paper document, especially those having cash-equivalent value, a risk of counterfeiting exists.

There are also disadvantages from the point of view of the purchaser. Generally, a purchaser may purchase gift certificates only at particular locations of sponsoring institutions. Purchasers must travel to sometimes inconvenient locations in order to purchase paper gift certificates. Additionally, the purchaser must take sufficient cash or other value to purchase the paper gift certificate. A further disadvantage is that the purchaser must choose a sponsoring institution from which to purchase a gift certificate since gift certificates are generally not honored by institutions other than the sponsoring institution. Yet a further disadvantage is that the purchaser must carry one or more paper certificates, frequently in varying denominations, until he or she gives them to the recipient or elects to redeem them. The paper certificates are frequently fully negotiable, and thus the purchaser has the exclusive burden of the risk of loss of paper certificates in his or her possession.

There are also disadvantages from the point of view of the recipient. As with sponsoring institutions and purchasers, the recipient bears the exclusive risk of losing paper certificates in his or her possession, and generally has no recourse for lost or stolen certificates. Paper certificates are frequently of a non-standard size and can therefore be inconvenient to carry in a wallet, handbag or other carrying device. In redeeming paper certificates, the recipient is limited in his or her selection to the goods or services provided by the given sponsoring institution, reducing its value to the recipient. Further, the sponsoring institution may require a certain percentage of the value of the paper certificate to be used at the sponsoring institution, and may not provide the recipient's change from a paper certificate transaction in cash.

There is, therefore, a need for a method and system of providing purchasable value which does not suffer the cost, inconvenience, and security disadvantages of paper certificates. Specifically, there is a need for a method and system of providing purchasable value in the form of a widely-accepted credit card, authorized by a purchaser for a limited amount as a part of his or her credit account, and usable only by a named recipient until the authorized limit is reached or until the expiration of a given time period.

SUMMARY OF THE INVENTION

The present invention provides a system and method for providing purchasable value in the form of a credit instrument. A purchaser authorizes an institution (hereafter the "sponsoring institution") with which he or she has a consumer credit account (hereafter, the "primary account") to create a secondary account within or linked to the primary account. The purchaser defines an expenditure limit (hereafter the "authorized value") and at least one authorized user for the secondary account. The authorized value, and any service charge, may be charged immediately upon authorization to the primary account. Alternatively, the amounts of the transactions made by the authorized user in using the secondary account may be posted to the purchaser's primary account as such transactions are made.

After authorization by the purchaser, the sponsoring institution issues a credit instrument (hereafter the "gift credit card") to the authorized user or users. The gift credit card is linked only to the secondary account and may only be used to purchase goods or services up to the limit of the secondary account, which was determined by the authorization of the purchaser. The authorized user may use the gift credit card at any retail or other location which honors credit instruments issued by the sponsoring institution or a credit processing network to which the sponsoring institution belongs.

The present system and method also includes a credit data storage and transaction processing system known in the art. The credit data storage and transaction processing system includes computer memory means for storing data of consumer credit accounts and computer means for processing credit transactions and adding or modifying data of consumer credit accounts stored in the computer memory means according to such transactions. Generally, the computer means receives data of a proposed transaction, compares such data to data in the computer memory means of the primary account identified during the transaction, and based on this comparison, approves or denies the transaction. If the transaction is approved, the computer means processes the transaction data to cause the completion of the transaction, the updating of the primary account data in the computer memory means, and the reporting of the transaction.

When used, the gift credit card is presented at a point of sale in offer of payment for goods and/or services (the "proposed transaction"). Data of the proposed transaction is transmitted from the point of sale to the computer means, which compares the proposed transaction data to data in the computer memory means concerning the secondary account, including the amount authorized for expenditure through the gift credit card. If the comparison is favorable (i.e., the amount of the proposed transaction is less than the secondary account's remaining authorized amount), then the transaction is approved, and the computer means adds the transaction data to or modifies the data of the secondary account in the secondary computer means. If the proposed transaction exceeds the remaining amount authorized, the transaction is denied. In this way, the gift credit card may be used until the authorized value is used up.

DESCRIPTION OF THE PREFERRED EMBODIMENT

Figure 1:
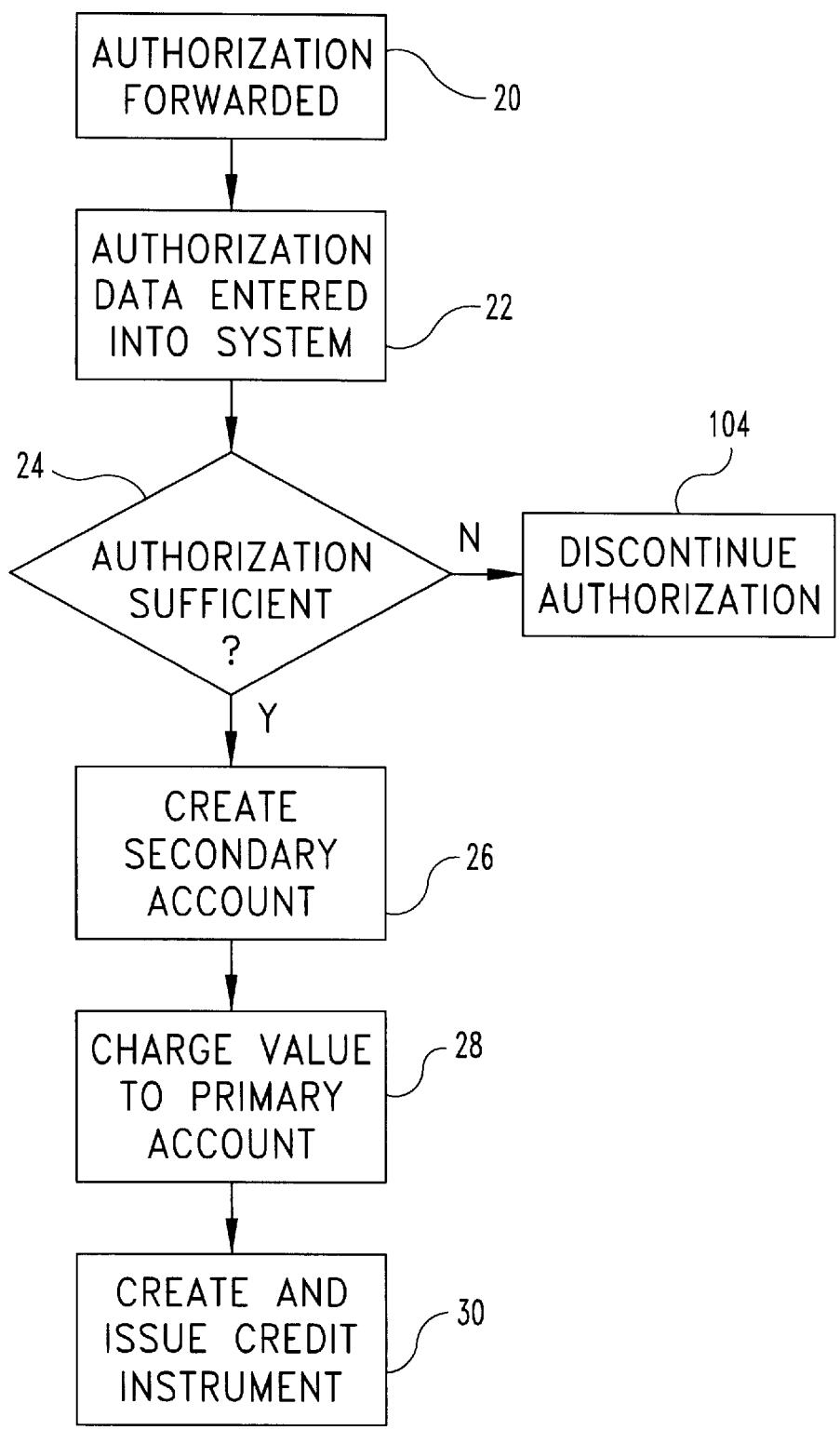
FIG. 1 is a schematic showing the computer programming and data processing for a preferred embodiment of the system and method of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, any alterations and further modification in the described or illustrated system or method, and any further applications of the principles of the invention as illustrated therein being contemplated as would normally occur to one skilled in the art to which the invention relates.

Referring generally to FIG. 1, the method and system of the present invention begins with functional block 20. In functional block 20, the purchaser of a gift credit card according to the present invention forwards an authorization for such gift credit card to a sponsoring institution with which he or she maintains a credit account. The authorization would generally include a submission of certain data required by the sponsoring institution. Such data may include the purchaser's name, address, account number, security code or password, and/or any other data which the sponsoring institution may deem necessary to ensure the accuracy and security of the authorization. The authorization also includes data of the authorized recipient of the gift credit card, which may comprise the recipient's name, address, and/or other identifying information. Additionally, the authorization includes an identified value for the gift credit card.

The authorization may be transmitted by the purchaser in any of a number of formats. In one embodiment, the purchaser may contact an authorized representative of the sponsoring institution and orally deliver the authorization. In another embodiment, the purchaser may enter the requested data in a paper or electronic form which is presented, delivered, or transmitted to the sponsoring institution or its authorized representative. The authorization data is entered into the credit data storage and transaction processing system, as depicted schematically in functional block 22.

Figure 2:
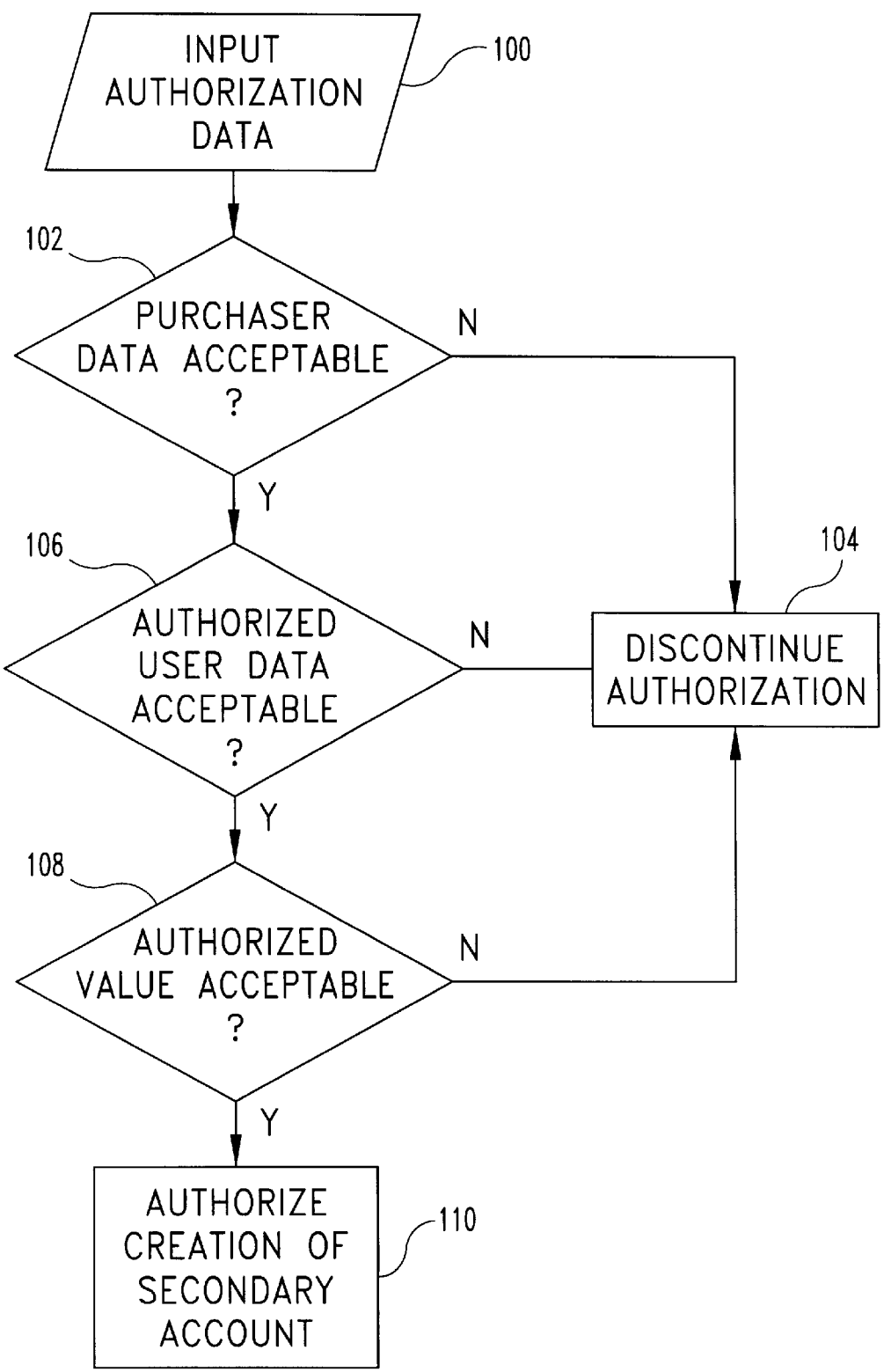
FIG. 2 is a schematic of the system and method which branches from FIG. 1 which concerns the receipt and analysis of a purchaser's authorization.

As shown in functional block 24, after the authorization data is sent to the sponsoring institution, the sponsoring institution examines the authorization data to determine whether the authorization is sufficient, accurate and otherwise acceptable. One embodiment of this examination process is schematically depicted in FIG. 2. In functional block 100, the computer means receives the authorization data. In functional block 102, the computer means compares the authorization data of the purchaser to data of the purchaser and/or other data stored in a computer memory means. If the authorization data regarding the purchaser is unacceptable, the computer means discontinues the authorization process, as schematically depicted in functional block 104. In the same way, the computer means processes the authorization data regarding the recipient to determine whether such data is sufficient, accurate and otherwise acceptable, by comparing the authorization data to data stored in a computer memory means, as schematically depicted in functional block 106. If such data is unacceptable, the computer means will discontinue the authorization process, as schematically depicted in functional block 104.

The computer means also processes the authorized value for the gift credit card to determine whether it is within established parameters, as depicted schematically in functional block 108. Such parameters may include an absolute minimum or maximum of gift credit card value set by the sponsoring institution, particular denominations set by the sponsoring institution, or a maximum determined by the amount of available credit in the primary account. For example, it may be a requirement that gift credit cards have a value of at least $100.00 and in $5.00 increments, not to exceed the purchaser's available credit line. If the requested amount is determined to be outside the given parameters, the CPU causes an error report to be generated and either causes a request to be issued for a new authorized amount or discontinues the authorization process. If the requested amount is within the given parameters, then the CPU issues an instruction authorizing the creation of a secondary account. In the described embodiment, the functions depicted in functional blocks 102, 106 and 108 may be conducted in any order. Upon satisfactory completion of the authorization steps, the computer means authorizes creation of a secondary account, as schematically depicted in functional block 110.

Figure 3:
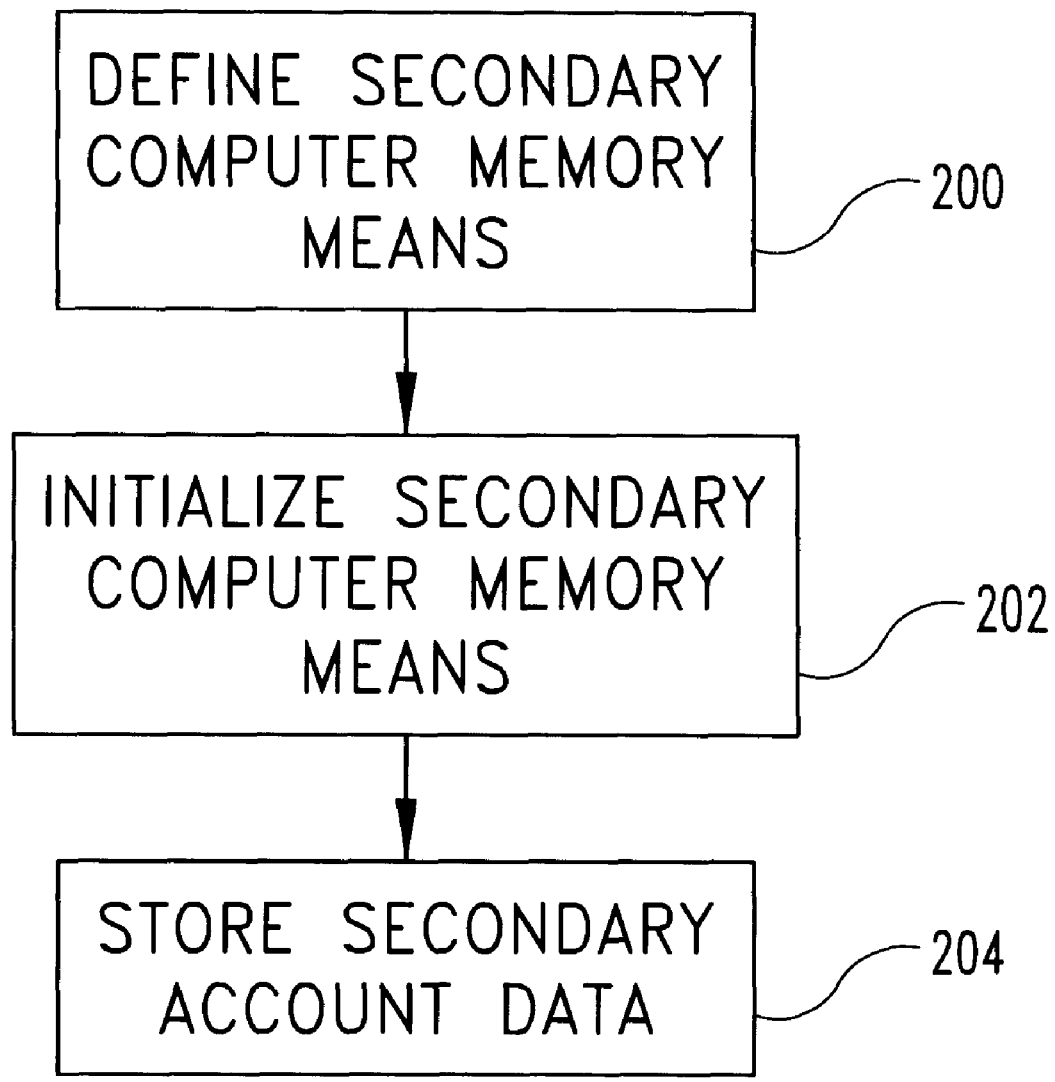
FIG. 3 is a schematic of the system and method which branches from FIG. 1, showing the creation of the secondary file according to the purchaser's authorization.

Referring again to FIG. 1, when the authorization process has been satisfactorily completed, the authorized secondary account related exclusively to the primary account is created, as schematically depicted in functional block 26. One embodiment of the creation of the secondary account is schematically depicted in FIG. 3. The creation of the secondary account may take the form of defining or identifying a secondary computer memory means for storing data of the secondary account, as schematically depicted in functional block 200. The secondary computer memory means, communicatively connected to the computer means, are initialized or otherwise prepared for storage of data of the secondary account, as depicted schematically in functional block 202. The authorized user data and the requested amount for the gift credit card are stored in the secondary computer memory means, as schematically depicted in functional block 204. In one embodiment, the secondary computer memory means is a part of the computer memory means in which the primary account data is stored. In a specific embodiment, the secondary account may be created by defining certain parts of the computer memory means allocated to the purchaser's account to be the secondary computer memory means for use with the secondary account.

Referring again to FIG. 1, the primary account is charged the authorized value of the secondary account. In one embodiment, the authorized value is charged to the primary account at one time, after the secondary account has been authorized, as schematically depicted in functional block 28. Alternatively, in another embodiment the authorized value may be charged to the primary account as it is used by the authorized user of the secondary account.

Figure 5A:
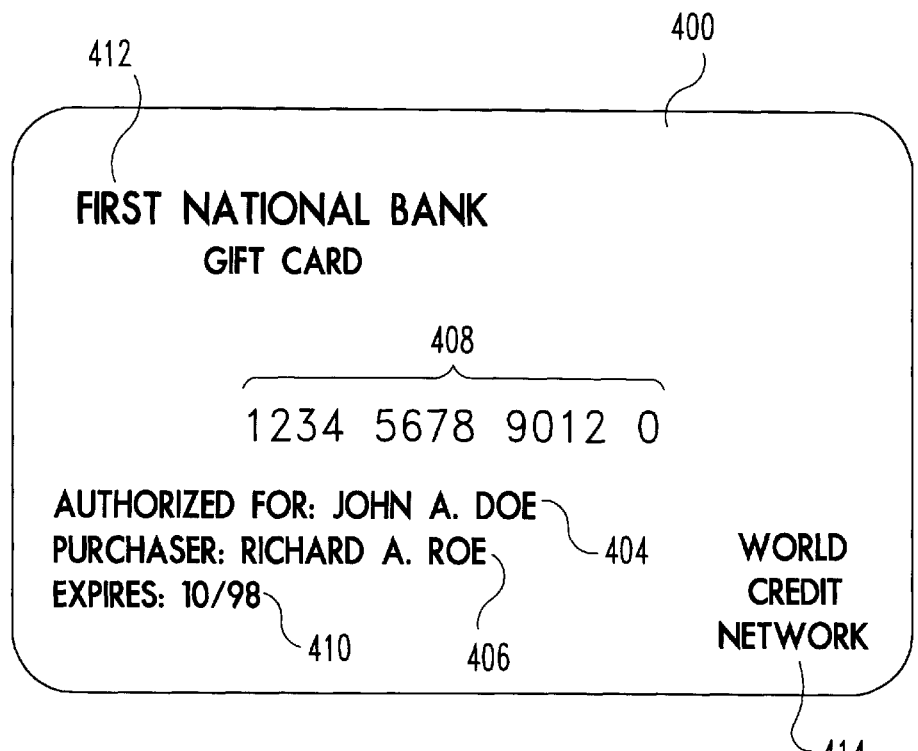
FIG. 5A depicts the front of one embodiment of the credit instrument or gift credit card to be used in the system and method of the present invention.
Figure 5B:
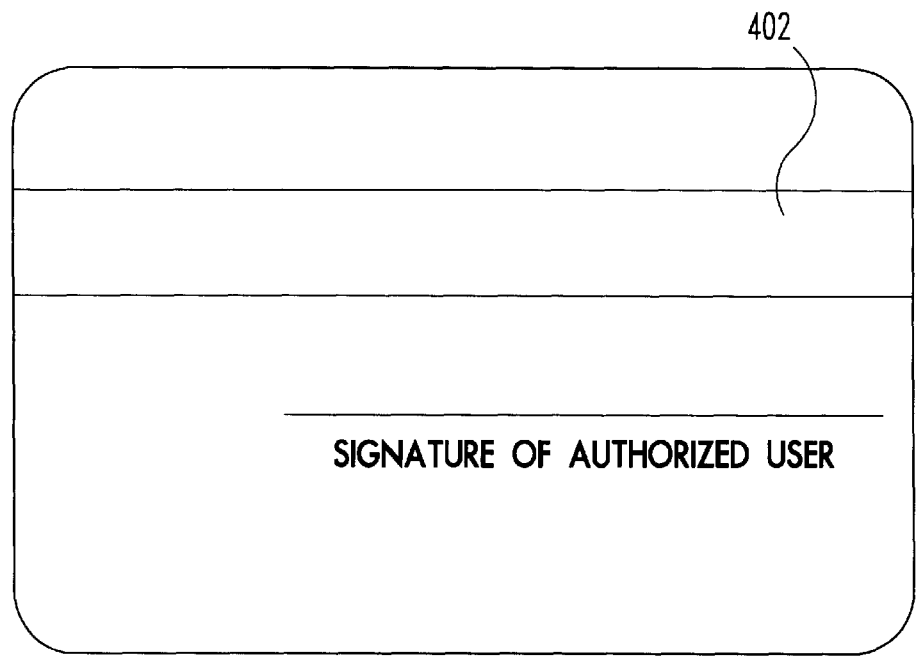
FIG. 5B depicts the reverse of the embodiment of the credit instrument shown in FIG. 5A.

After the creation of the secondary account, a credit instrument is created and issued to the authorized user defined in the secondary account, as depicted schematically in functional block 30. Referring now to FIGS. 5A and 5B, the credit instrument is shown in one embodiment. The credit instrument may be a credit card 400, such as those made of plastic and having a magnetic data strip 402 thereon. Such cards may include identifying data such as the authorized user's name 404, the name of the purchaser 406, and possibly the purchaser's account number 408 and an expiration date 410. The authorized user's signature may also be placed on the back as known in the art. The trade name, trademark, logo, or other identification of the sponsoring institution (denoted by 412 in FIG. 5A) and the credit system or network (e.g. Visa, Mastercard, Diner's Club, etc.; denoted by 414 in FIG. 5A) may also be placed on the credit instrument.

The credit instrument ("gift credit card") should include an identification of the instrument as linked to a specific secondary account, and may identify the specific primary account to which the secondary account is exclusively related. These identifications may be in the form of lettering, imprinting, magnetic storage, or other methods of identification. Referring to FIG. 5A, in one embodiment the credit instrument may have the primary account number 408 with an extra digit 416 imprinted thereon or included in the magnetic data strip, identifying a secondary account related to the purchaser's primary account. Alternatively, when the gift credit card is used, as described below, additional data may be entered at the point of sale to identify it with a secondary account related exclusively to the purchaser's primary account.

Figure 4:
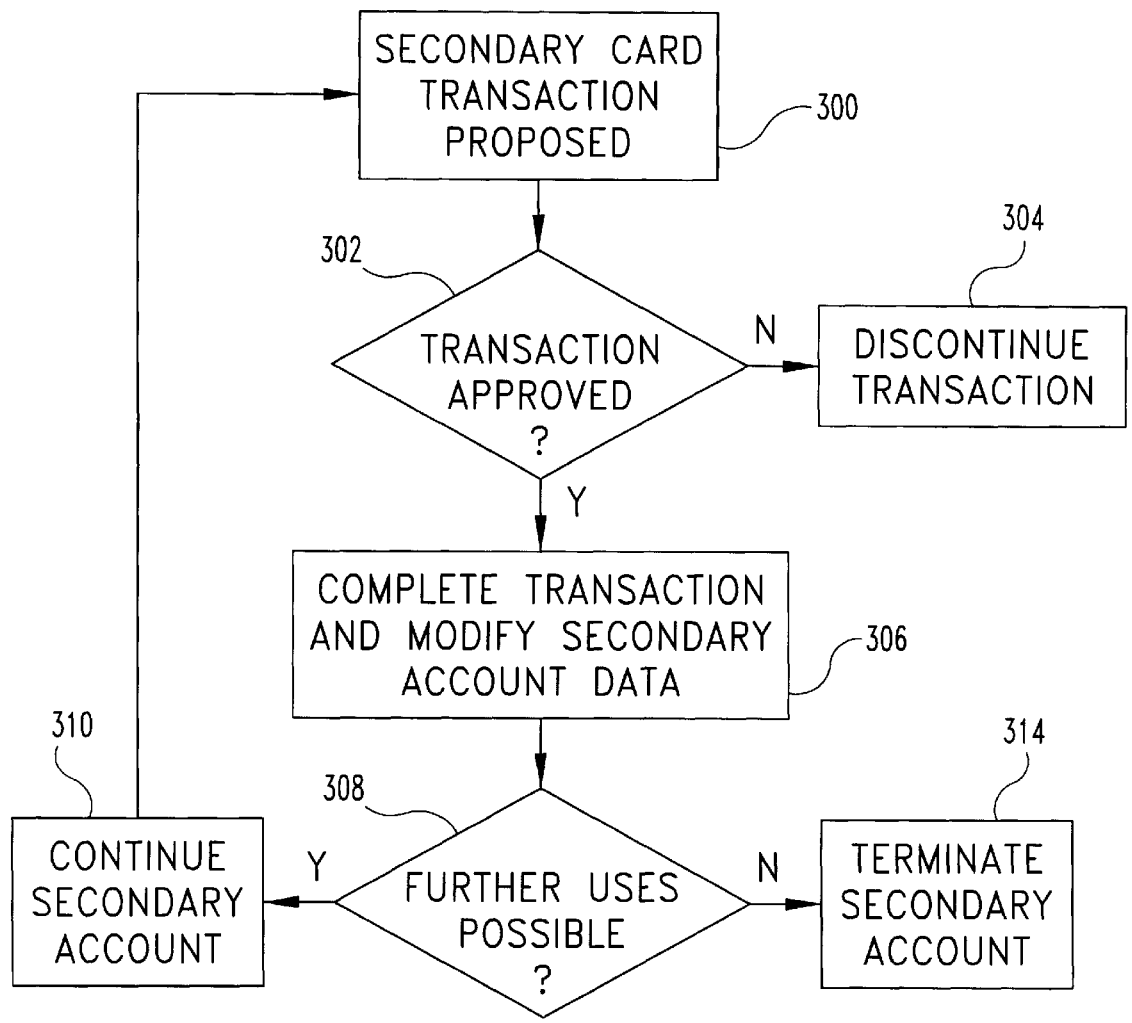
FIG. 4 is a schematic of the system and method which branches from FIG. 1, showing the use of a credit instrument configured to interact only with the secondary account in the credit transaction system.

The issued gift credit card may be sent to the purchaser or directly to the authorized user. Referring now to FIG. 4, after the gift credit card is received by the authorized user, he or she may use the gift credit card for purchases through the credit data storage and transaction processing system. In functional block 300, the recipient tenders the gift credit card at a point of sale in payment for goods or services to a seller which honors credit instruments issued by a certain sponsoring institution, system, or network. In functional block 302 the computer means of the credit data storage and transaction processing system determines whether to approve the transaction. The computer means compares data of the transaction from the point of sale to the data of the secondary account stored in the secondary computer means. If the comparison is unfavorable (e.g. the transaction amount is larger than the initial value of the secondary account less the value of any prior transactions with the gift credit card, or is otherwise unacceptable), then the transaction is not approved by the computer means, and the transaction is discontinued, as schematically depicted in functional block 304.

If the transaction is approved by the computer means, the computer means completes the transaction, and modifies or adds to the data of the secondary account in the secondary computer memory means to reflect the result of the transaction, as schematically depicted in functional block 306. For example, the amount of a purchase transaction may be subtracted from the initial value (or remaining value, if transactions have already been made) of the secondary account, and a new "remaining value" may be stored in the secondary computer means. The computer means then determines, based on the data stored in the secondary computer memory means, whether further uses of the gift credit card are permitted as depicted in functional block 308. If so, then the computer means allows the secondary account to continue, as schematically depicted in functional block 310. If, however, no further uses are permitted (i.e. the initial value of the secondary account has been used up), the credit data storage and transaction processing system will terminate the secondary account, as schematically depicted in functional block 314. On termination, the credit data storage and transaction processing system will automatically deny any further proposed transactions using the gift credit card. The credit data storage and transaction processing system cannot renew the value of the secondary account automatically. In one embodiment, the secondary account may be reauthorized by the primary account holder for another value. Alternatively, termination ends the secondary account, and the purchaser cannot reauthorize it. although new secondary account(s) may be available to the purchaser.

In one embodiment, the secondary account may also be terminated through the lapse of time. At the time the secondary account is created, an expiration date (e.g. the date one year from the date of creation of the secondary account) may be stored in the secondary computer memory means. The computer means may compare such expiration date with the current date, either as a periodic routine or as a part of the processing of transactions. If the computer means determines that the current date is later than the expiration date, the secondary account is terminated.

Figure 6:
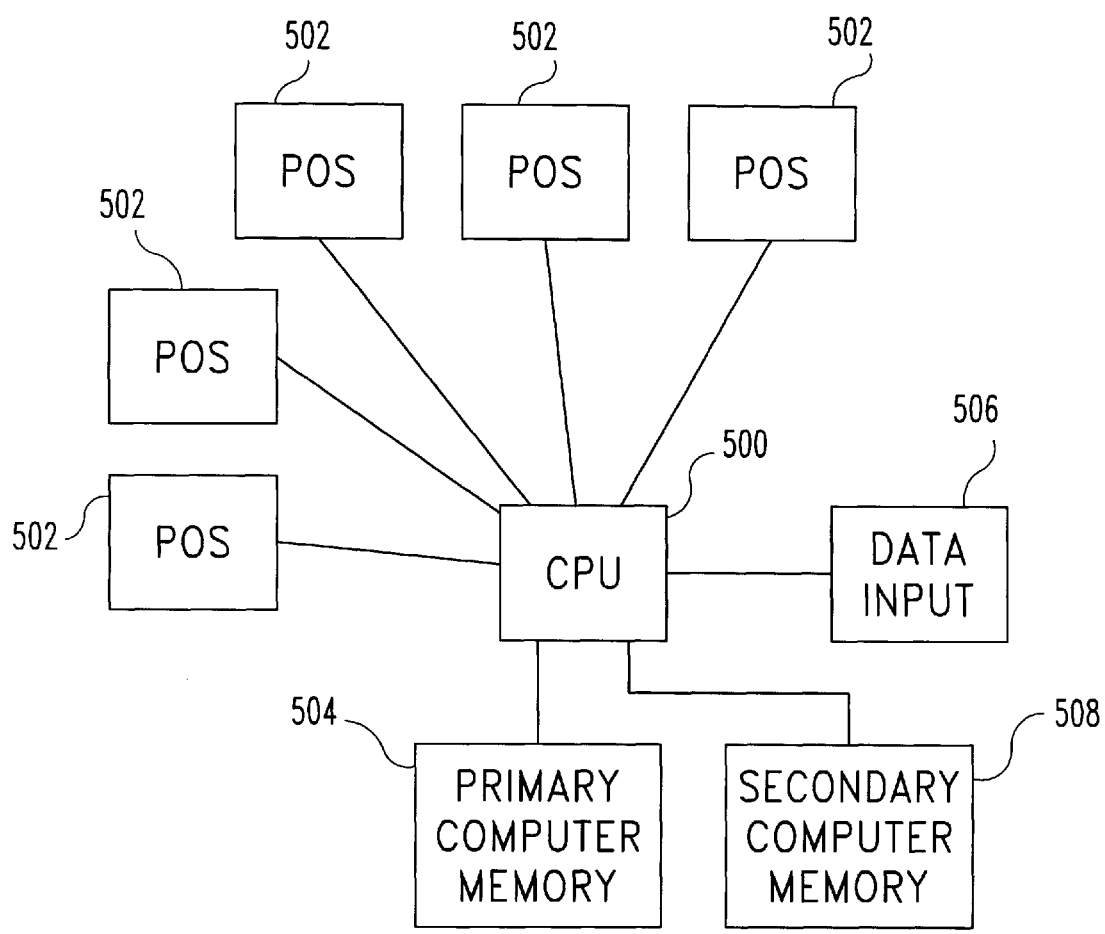
FIG. 6 is a schematic of the credit transaction system of the present invention.

Referring now to FIG. 6, the apparatus used to carry out the method and system of the present invention comprises a credit data storage and transaction processing system known in the art, and may include a central processing unit (CPU) 500 capable of processing the data associated with consumer credit accounts, a plurality of points of sale 502 communicatively connected to the CPU, primary computer memory means 504 communicatively connected to the CPU for storing data associated with consumer credit accounts, and data input means 506. In addition, the system of the present invention includes secondary computer memory means 508 communicatively connected to the CPU for storing data associated with authorized secondary or gift credit card accounts. In one embodiment, the secondary computer memory means 508 comprises a specific portion of that part of the primary computer memory means 504 devoted to the primary account to which the secondary account is exclusively related.

In operation, data concerning the creation or authorization of the secondary account is entered using data input means 506, processed by CPU 500, and stored in secondary computer memory means 508. When the gift credit card is used at one of the points of sale 502, data of the transaction (which may comprise amount and date of the transaction and identification information of the secondary account and the authorized user) is communicated to CPU 500, which compares such data with data of the particular secondary account associated with the gift credit card from secondary computer memory means 508. CPU 500 may transmit messages to the point of sale 502 concerning approval or denial of the transaction or of the authorized amount in the secondary account. CPU 500 also processes and completes approved transactions, storing new or modified data in secondary computer memory means 508 associated with the secondary account.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A credit transaction system, comprising:
    a plurality of points of sale;
    a credit data storage and transaction processing system communicatively connected to said points of sale, said credit data storage and transaction processing system including first computer memory for storing credit account data of a primary credit account, and a processor for processing said credit account data and transaction data communicated to said processor from said points of sale;
    second computer memory communicatively connected to said processor adapted to store data of a secondary account, said secondary account having an initially-determined value and being exclusively related to said primary account; and
    a credit instrument for conducting transactions at one or more of said plurality of points of sale, said credit instrument uniquely identifying said secondary account,
    wherein data of said transactions are processed by said processor and stored in said second computer memory, and wherein said processor terminates said secondary account when said credit instrument has been used for said transactions such that the value of said transactions substantially equals said initially-determined value of said secondary account.

2. The system of claim 1, wherein said primary account is controlled by a primary account holder, and said initially-determined value of said secondary account is charged to the primary account holder.

3. The system of claim 2, wherein said initially-determined value is charged to said primary account.

4. The system of claim 3, wherein said initially-determined value is charged at one time.

5. The system of claim 3, wherein said initially-determined value is charged at a plurality of times as said secondary account is used.

6. The system of claim 3, wherein said points of sale are affiliated with a single retail institution.

7. The system of claim 1, wherein said points of sale are affiliated with multiple retail institutions.

8. The system of claim 1, wherein said credit instrument includes at least one datum identifying said secondary account.

9. The system of claim 8, wherein said datum is imprinted on the face of said credit instrument.

10. The system of claim 8, wherein said datum is magnetically stored on said credit instrument.

11. A method of creating and processing a secondary account linked to a primary credit account and having an initially-determined limit, comprising the steps of:
    receiving authorization from a holder of a primary credit account to create said secondary account;
    determining whether said authorization is sufficient;
    creating said secondary account if said authorization is determined to be sufficient;
    creating a credit instrument uniquely identifying said secondary account for use in credit transactions;
    providing said credit instrument to the primary account holder or to an authorized user;
    allowing continued use of said credit instrument for credit transactions as long as the cumulative value of the transactions does not exceed the initially-determined value; and
    terminating said secondary account when the cumulative value of the transactions made using said credit instrument substantially equals said initially-determined value.

12. The method of claim 11, further comprising the step of charging the initially-determined value to the holder of the primary credit account.

13. The method of claim 12, wherein said charging step is performed by charging the initially-determined value to the primary credit account.

14. The method of claim 11, further comprising the step of charging the value of transactions made using said credit instrument to the primary credit account.

15. The method of claim 11, wherein said receiving step includes receiving authorization data submitted in paper or electronic form.

16. The method of claim 11, further comprising the step of terminating said secondary account after passage of a predetermined amount of time.

* * * * *